United States Patent
Kakimura

(10) Patent No.: US 10,483,509 B2
(45) Date of Patent: Nov. 19, 2019

(54) ENERGY STORAGE APPARATUS, MOVING BODY, AND ENERGY STORAGE SYSTEM

(71) Applicants: Blue Energy Co., Ltd., Kyoto-shi (JP); Honda Motor Co., Ltd., Tokyo (JP)

(72) Inventor: Hiroaki Kakimura, Kyoto (JP)

(73) Assignees: BLUE ENERGY CO., LTD., Kyoto-shi, Kyoto (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/054,813

(22) Filed: Aug. 3, 2018

(65) Prior Publication Data

US 2019/0051871 A1 Feb. 14, 2019

(30) Foreign Application Priority Data

Aug. 8, 2017 (JP) .................................. 2017-153397

(51) Int. Cl.
- *H01M 2/10* (2006.01)
- *B60K 1/04* (2019.01)
- *H01M 2/30* (2006.01)

(52) U.S. Cl.
CPC ............. *H01M 2/1077* (2013.01); *B60K 1/04* (2013.01); *H01M 2/305* (2013.01)

(58) Field of Classification Search
CPC ........ B60K 1/04; H01M 2/1077; H01M 2/305
See application file for complete search history.

(56) References Cited

U.S. PATENT DOCUMENTS

| 9,487,237 B1 * | 11/2016 | Vollmer | B62D 21/152 |
| 2007/0068714 A1 * | 3/2007 | Bender | B60L 50/30 180/65.29 |
| 2011/0297469 A1 * | 12/2011 | Usami | B60K 1/04 180/68.5 |

(Continued)

FOREIGN PATENT DOCUMENTS

| JP | 2013-246990 A | 12/2013 |
| JP | 2014-035969 A | 2/2014 |

(Continued)

*Primary Examiner* — Brian L Swenson
(74) *Attorney, Agent, or Firm* — McGinn IP Law Group, PLLC

(57) ABSTRACT

An energy storage apparatus includes an energy storage device including a surface having a first end face from which an external terminal protrudes and a second end face on an opposite side from the first end face and a retaining member that includes paired end members disposed on opposite sides of the energy storage device in a second direction orthogonal to a first direction in which the external terminal protrudes and a coupling portion for coupling the paired end members. The coupling portion includes a main body portion facing the energy storage device in a third direction orthogonal to the first direction and the second direction, a first extending portion extending along the first end face from the main body portion, and an end extending portion extending along the end member from the main body portion, a drain portion is provided to a position of the energy storage apparatus near the second end face, and the main body portion, the first extending portion, and the end extending portion are connected to each other to thereby form a first end corner portion of the coupling portion.

4 Claims, 13 Drawing Sheets

(56) References Cited

U.S. PATENT DOCUMENTS

| | | | |
|---|---|---|---|
| 2013/0112491 A1* | 5/2013 | Suzuki | B60K 1/02 |
| | | | 180/65.21 |
| 2013/0273397 A1* | 10/2013 | Watanabe | H01M 2/1077 |
| | | | 429/53 |
| 2015/0140405 A1* | 5/2015 | Sakurai | H01G 11/76 |
| | | | 429/154 |
| 2015/0140408 A1 | 5/2015 | Hayashida et al. | |
| 2017/0033336 A1 | 2/2017 | Hoshino et al. | |
| 2018/0147953 A1* | 5/2018 | Lee | B60L 58/26 |
| 2018/0170188 A1* | 6/2018 | Uneme | B60K 6/442 |
| 2019/0061505 A1* | 2/2019 | Cavus | B60K 1/04 |

FOREIGN PATENT DOCUMENTS

| | | |
|---|---|---|
| JP | 2015-099650 A | 5/2015 |
| JP | WO2013/179797 A1 | 1/2016 |
| JP | 2016-031898 4 | 3/2016 |

\* cited by examiner

ENERGY STORAGE APPARATUS, MOVING BODY, AND ENERGY STORAGE SYSTEM

CROSS-REFERENCE TO RELATED APPLICATIONS

This application is based on Japanese Patent Application No. 2017-153397, filed on Aug. 8, 2017, the entire contents of which are hereby incorporated by reference.

FIELD

The present invention relates to an energy storage apparatus including an energy storage device and a retaining member for retaining the energy storage device, a moving body including the energy storage apparatus, and an energy storage system including the energy storage apparatus.

BACKGROUND

Conventionally, there is a known battery block 100 including a battery stacked product 102 formed by stacking a plurality of battery cells 101 and a fixing member 103 for fastening the battery stacked product 102 in a stack direction as shown in FIGS. 14 and 15 (see JP 2013-246990 A).

Each of the battery cells 101 includes a prismatic cover case 1011 with a bottom, a sealing plate 1012 for closing an opening portion of the cover case 1011, and electrode terminals 1013 provided to opposite end portions of the sealing plate 1012.

The fixing member 103 includes end plates 104 disposed at opposite ends of the battery stacked product 102 and coupling fixtures 105 fixed to the end plates 104 to fasten the battery stacked product 102 in the stack direction with end plates 104 interposed therebetween.

Each of the coupling fixtures 105 is extending in the stack direction of the battery stacked product 102 and has an L shape in cross-section. Specifically, each of the coupling fixtures 105 has a plate-shaped first portion 1051 along outer side faces 101A of the battery cells 101, a plate-shaped second portion 1052 along top faces 101B or bottom faces 101C of the battery cells 101, and plate-shaped third portions 1053 along the end plates 104. At each end portion of each of the coupling fixtures 105 in the stack direction, the plate-shaped first to third portions 1051 to 1053 are connected continuously (without leaving clearances therebetween), each of corner portions 106 of the coupling fixture 105 is formed. The coupling fixers 105 formed in this manner are fixed to the end plates 104 disposed at the opposite ends of the battery stacked product 102 to thereby fasten the battery stacked product 102 in the stack direction with the end plates 104 interposed therebetween.

In the above-described battery block 100, because there are no clearances at the corner portions 106 of the coupling fixers 105, water (condensed water or the like) is accumulated in the corner portions 106 positioned on a lower side depending on an attitude of the battery block 100 and the accumulated water may make the battery cells 101 and the fixing member 103 electrically continuous with each other in some cases when condensation or the like occurs on faces of the coupling fixtures 105 facing the battery cells 101 due to a change in a temperature around the battery block 100 or the like.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of embodiments is to provide an energy storage apparatus in which water is less likely to be accumulated in a member for retaining energy storage devices, a moving body including the energy storage apparatuses, and an energy storage system including the energy storage apparatuses.

According to an aspect of embodiments, there is provided an energy storage apparatus including an energy storage device including a surface having a first end face from which an external terminal protrudes and a second end face on an opposite side from the first end face and a retaining member that includes paired end portions disposed on opposite sides of the energy storage device in a second direction orthogonal to a first direction in which the external terminal protrudes and a coupling portion for coupling the paired end portions and that retains the energy storage device, wherein the coupling portion includes a main body portion facing the energy storage device in a third direction orthogonal to the first direction and the second direction, a first extending portion extending along the first end face from the main body portion, and an end extending portion extending along the end portion from the main body portion, a drain portion is provided to a position of the energy storage apparatus near the second end face, and the main body portion, the first extending portion, and the end extending portion are continuously connected to each other to thereby form a first end corner portion of the coupling portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
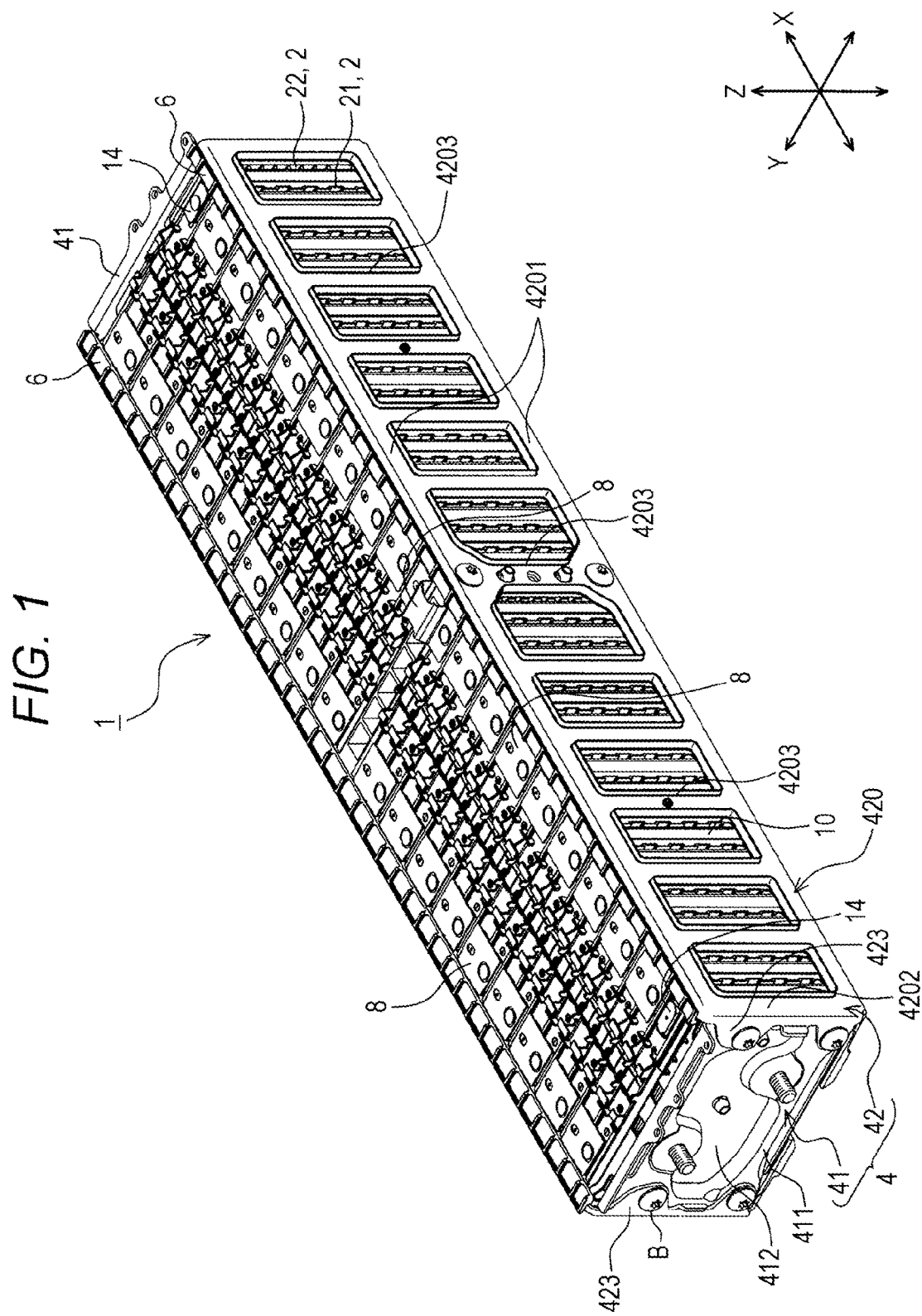
FIG. 1 is a perspective view of an energy storage apparatus according to a first embodiment.
Figure 2:
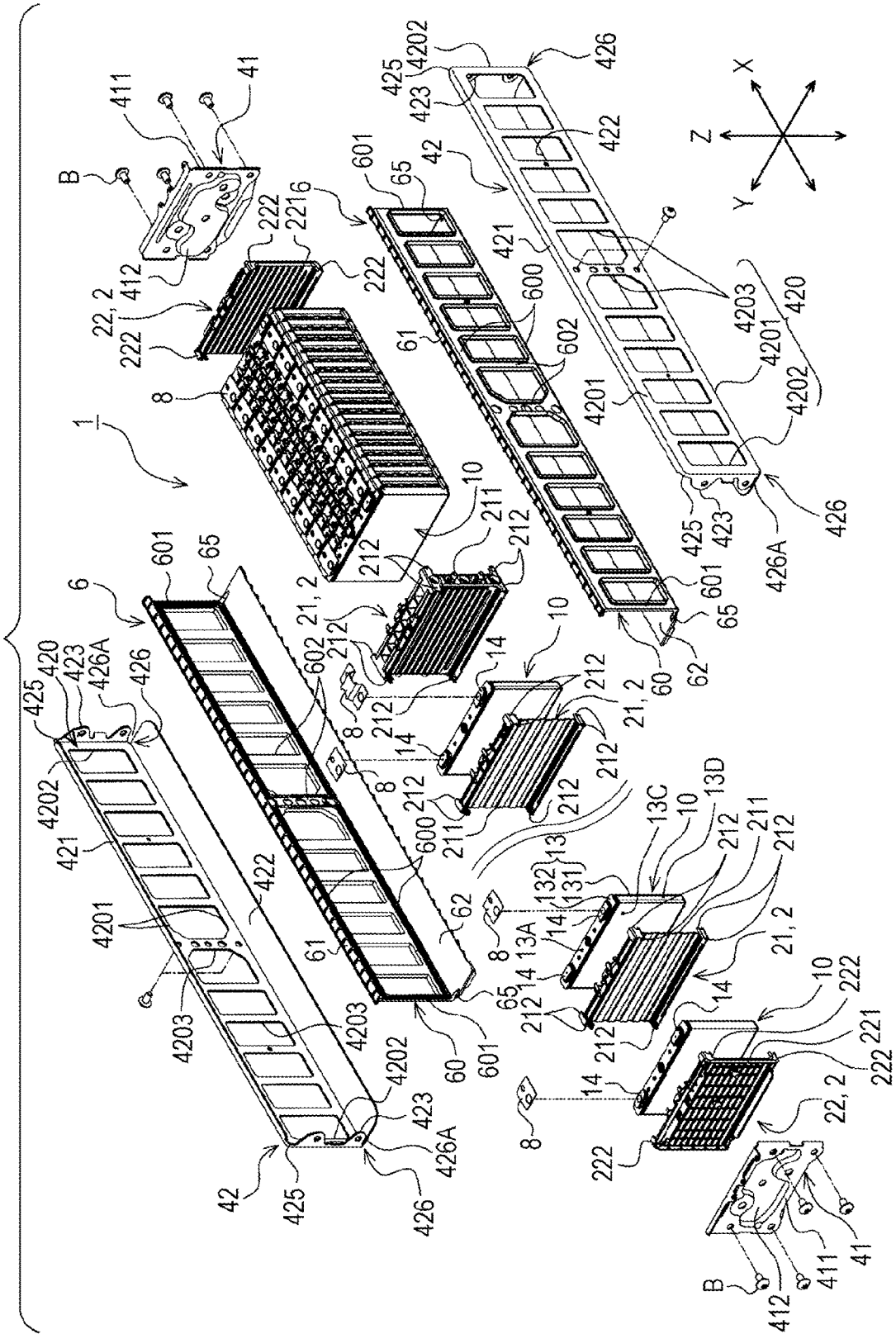
FIG. 2 is an exploded perspective view of the energy storage apparatus a part of which is not shown.
Figure 3:
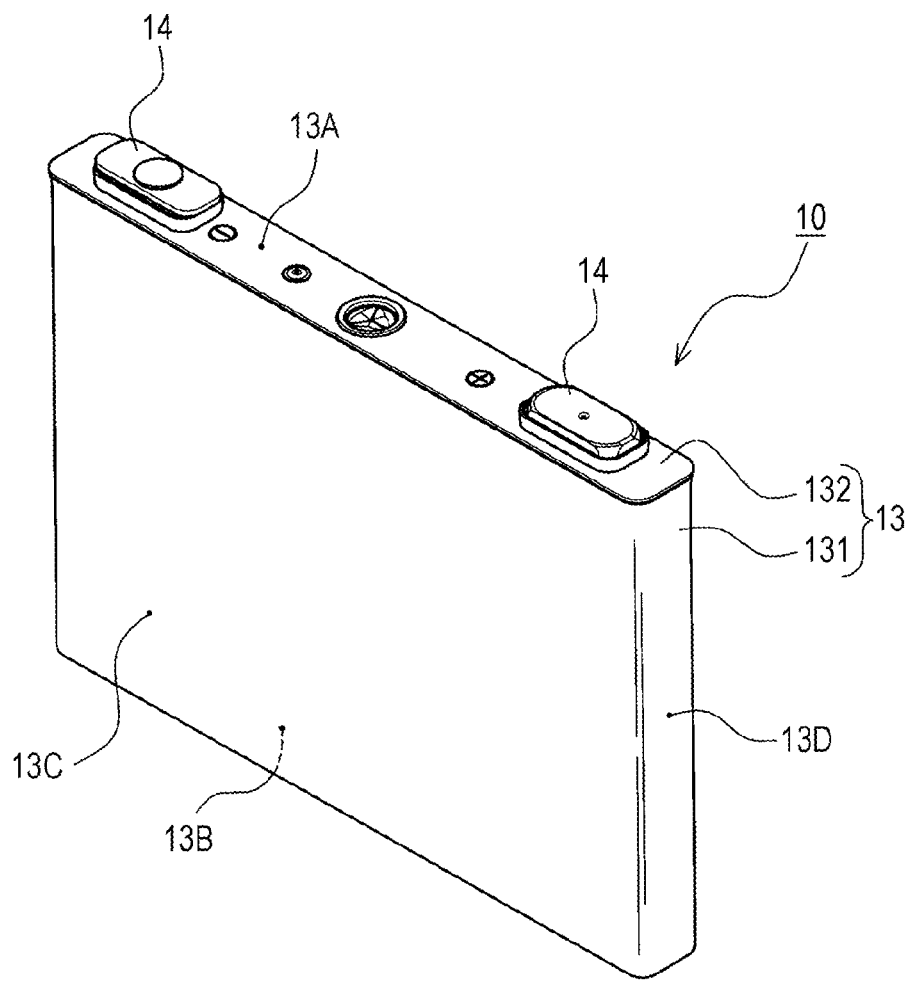
FIG. 3 is a perspective view of an energy storage device included in the energy storage apparatus.
Figure 3:
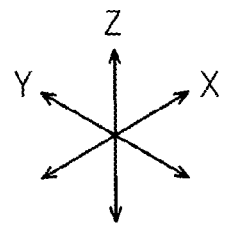
Figure 4:
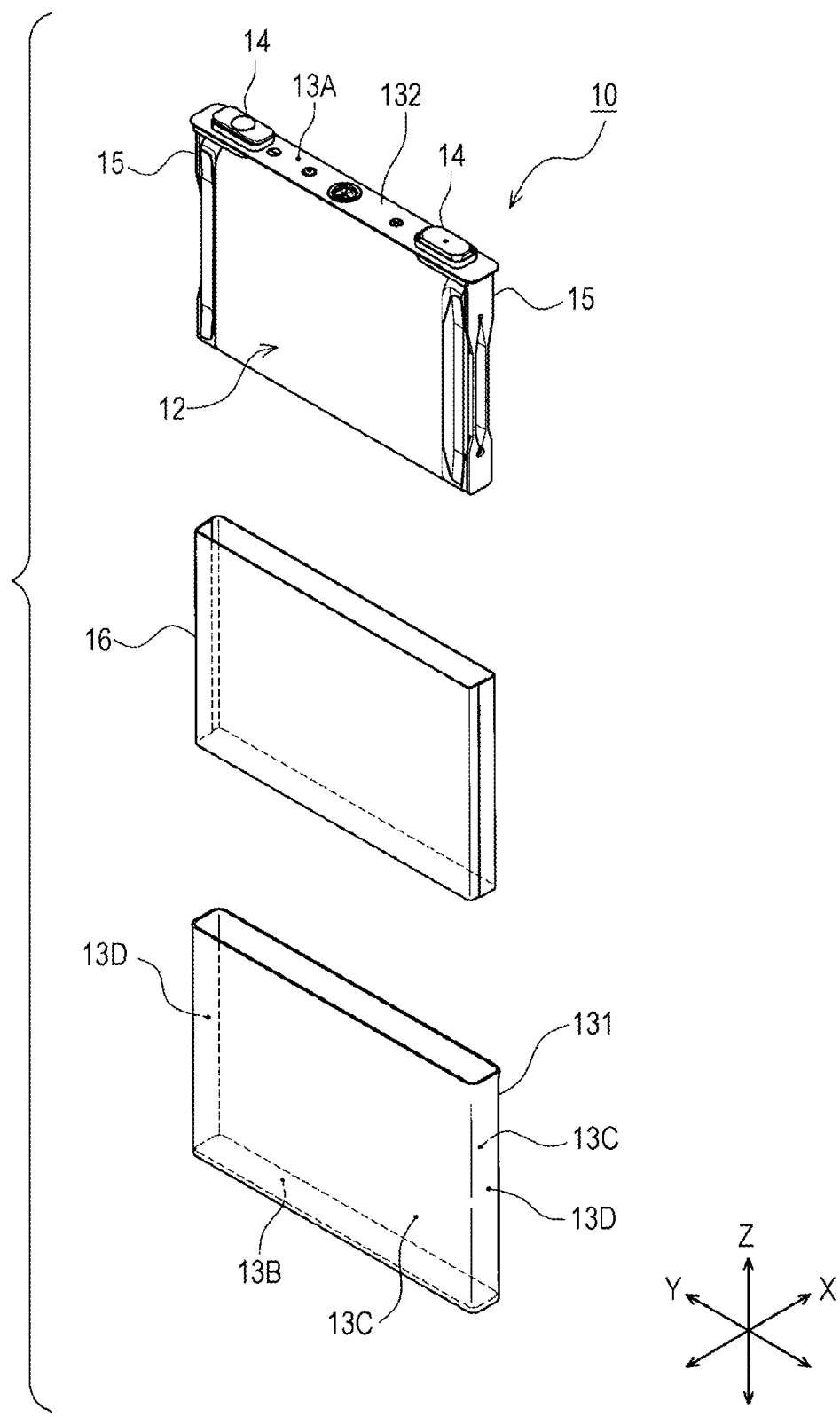
FIG. 4 is an exploded perspective view of the energy storage device.

According to an aspect of embodiments, there is provided an energy storage apparatus including an energy storage device including a surface having a first end face from which an external terminal protrudes and a second end face on an opposite side from the first end face and a retaining member that includes paired end portions disposed on opposite sides of the energy storage device in a second direction orthogonal to a first direction in which the external terminal protrudes and a coupling portion for coupling the paired end portions and that retains the energy storage device, wherein the coupling portion includes a main body portion facing the energy storage device in a third direction orthogonal to the first direction and the second direction, a first extending portion extending along the first end face from the main body portion, and an end extending portion extending along the end portion from the main body portion, a drain portion is provided to a position of the energy storage apparatus near the second end face, and the main body portion, the first extending portion, and the end extending portion are continuously connected to each other to thereby form a first end corner portion of the coupling portion.

With this configuration, when the energy storage apparatus is disposed with the drain portion positioned at a lower end portion of the energy storage apparatus, water of condensation or the like occurring on each of the faces of the retaining member facing the energy storage device is drained outside through the drain portion and therefore the water is less likely to be accumulated in the retaining member.

The energy storage apparatus may further include an insulating member for covering at least a face of the coupling portion facing the energy storage device, wherein the coupling portion may have a second extending portion extending along the second end face from the main body portion, the insulating member may have a convex part positioned astride the main body portion and the second extending portion between each of the end portions and the energy storage device adjacent to the end portion, and the drain portion may be disposed on an outer side of the convex portion in the second direction.

With this configuration, even if the water remains undrained from an end portion in the second direction of the retaining member through the drain portion, the water is prevented by the convex part from flowing toward the energy storage device. As a result, it is possible to suppress electrical continuity between the retaining member and the energy storage device through the water.

In this case, in the energy storage apparatus, the first extending portion and the second extending portion may respectively and continuously extend from one of the end portions to the other end portion in the second direction and a dimension of the second extending portion may be larger than a dimension of the first extending portion in the third direction.

Because the dimension of the second extending portion is larger than the dimension of the first extending portion in the third direction in the retaining member in this manner, it is possible to prevent strength of a portion of the retaining member on a side of the second extending portion from becoming lower than a portion on a side of the first extending portion including the first end corner portion strength of which is secured by continuously connecting the portions in the three directions (the first extending portion, the main body portion, and the end extending portions or the end portions).

According to another aspect of embodiments, there is provided a moving body including: any of the above-described energy storage apparatuses; a moving body main body mounted with the energy storage apparatus; and a drive portion for driving the moving body main body by using electric power supplied from the energy storage apparatus, wherein the energy storage apparatus is disposed with the drain portion positioned at a lower end portion of the energy storage apparatus.

With this configuration, because the drain portion is disposed at the lower end portion of the energy storage apparatus mounted into the moving body, the water is less likely to be accumulated in the retaining member.

According to another aspect of embodiments, there is provided an energy storage system including: any of the above-described energy storage apparatuses; an energy storage system main body mounted with the energy storage apparatus; and an input/output terminal which is connected to the energy storage apparatus and through which electric power can be input from outside and output to the outside, wherein the energy storage apparatus is disposed with the drain portion positioned at a lower end portion of the energy storage apparatus.

With this configuration, because the drain portion is disposed at the lower end portion of the energy storage apparatus mounted into the energy storage system, the water is less likely to be accumulated in the retaining member.

As described above, according to the aspects of the embodiments, it is possible to provide the energy storage apparatus in which the water is less likely to be accumulated in the retaining member, the moving body including the energy storage apparatus, and the energy storage system including the energy storage apparatus.

A first embodiment of the present invention will be described below with reference to FIGS. 1 to 11. Names of respective component members (respective component elements) in the embodiment are the names in the embodiment and may be different from those of respective component members (respective component elements) in "BACKGROUND".

As shown in FIGS. 1 to 4, an energy storage apparatus includes energy storage devices 10, each of the energy storage devices 10 including a surface having a first end face 13A from which external terminals 14 protrude and a second end face 13B on an opposite side from the first end face 13A, and a retaining member 4 for retaining the energy storage devices 10. The energy storage apparatus 1 in the embodiment includes the plurality of energy storage devices 10 arranged in a predetermined direction (X-axis direction). The energy storage apparatus 1 includes a plurality of adjacent members 2 adjacent to the energy storage devices 10, insulators (insulating members) 6 disposed between the retaining member 4 and the plurality of energy storage devices 10, and bus bars 8 connected to the external terminals 14 of the energy storage devices 10.

As the energy storage device 10, there are a primary battery, a secondary battery, a capacitor, and the like. The energy storage device 10 in the embodiment is a chargeable and dischargeable nonaqueous electrolyte secondary battery. More specifically, the energy storage device 10 in the embodiment is a lithium ion secondary battery which uses electron transfer caused by transfer of lithium ions.

To put it concretely, each of the energy storage devices 10 includes an electrode assembly 12, a case 13 for housing the electrode assembly 12 with electrolyte solution, the external terminals 14 at least parts of which are exposed to an outside of the case 13, current collectors 15 each of which connects the electrode assembly 12 and each of the external terminals 14, and an in-case insulating body 16 disposed between the electrode assembly 12 and the case 13.

In the electrode assembly 12, a positive electrode and a negative electrode are layered alternately with separators interposed therebetween. The electrode assembly 12 in the embodiment is what is called a wound electrode assembly formed by winding the long positive electrode and the long negative electrode layered alternately with the separators interposed therebetween. Energy storage device 10 is charged and discharged by movements of lithium ions between the positive electrode and the negative electrode in the electrode assembly 12.

The case 13 includes a case main body 131 having an opening and a lid plate 132 for closing the opening of the case main body 131. The case main body 131 in the embodiment has a prismatic cylindrical shape with a bottom and the case 13 has a rectangular parallelepiped shape (hexahedral shape). The case 13 has the flat rectangular parallelepiped shape and the plurality of energy storage devices 10 are arranged in an X-axis direction with wide faces of the cases 13 facing each other.

In the following description, the face (outer face of the lid plate 132) from which the external terminals 14 protrude is also referred to as the first end face 13A, the end face of the hexahedral case 13 on an opposite side from the first end face 13A is also referred to as the second end face 13B, opposite end faces facing the adjacent energy storage devices 10 are also referred to as third end faces 13C, and opposite end faces in a direction (Y-axis direction) orthogonal to directions of the normals to the first end face 13A and the second end face 13B (Z-axis direction) and the X-axis direction are also referred to as fourth end faces 13D.

Each of the adjacent members 2 is disposed between the energy storage devices 10 arranged in the X-axis direction or between the energy storage device 10 and a member (a part of the retaining member 4 in an example in the embodiment) disposed side by side with the energy storage device 10 in the X-axis direction. The adjacent members 2 include a plurality of kinds of adjacent members. The adjacent members 2 in the embodiment include the first adjacent members 21 each of which is disposed between the adjacent energy storage devices 10 and the second adjacent members 22 each of which is disposed on an outer side of the energy storage device 10 at the very end in the X-axis direction.

Each of the first adjacent members 21 has an insulation property and is disposed between the adjacent energy storage devices 10 to thereby secure a clearance (creepage distance or the like) between the energy storage devices 10. Specifically, each of the first adjacent members 21 includes a first main body portion 211 adjacent to the energy storage devices 10 (case main bodies 131) and first restricting portions 212 for restricting movements of the energy storage devices 10 with respect to the first main body portion 211.

The first main body portion 211 is a portion facing the third end faces 13C of the energy storage devices 10 and spreading in a direction of a Y-Z plane (plane including the Y axis and the Z axis). The first main body portion 211 in the embodiment forms a flow path through which fluid (air in the example in the embodiment) for temperature adjustment can flow between the adjacent energy storage devices 10 and the first main body portion 211.

The first restricting portions 212 extend in the X-axis direction from the first main body portion 211 and come in contact with the energy storage devices 10 (specifically, the cases 13), adjacent to the first main body portion 211, from outside in the direction of the Y-Z plane to thereby restrict the movements of the energy storage devices 10 in the direction of the Y-Z plane with respect to the first main body portion 211.

Each of the second adjacent members 22 has an insulation property and is disposed between the energy storage device 10 and the retaining member 4 (end member 41) in the X-axis direction to thereby secure a clearance (creepage distance or the like) between the energy storage device 10 and the retaining member 4 (end member 41). Specifically, each of the second adjacent members 22 includes a second main body portion 221 adjacent to the energy storage device 10 between the energy storage device 10 and the retaining member 4 and second restricting portions 222 for restricting a movement of the energy storage device 10 with respect to the second main body portion 221.

The second main body portion 221 is a portion facing the third end face 13C of the energy storage device 10 and spreading in the direction of the Y-Z plane. The second main body portion 221 in the embodiment forms a flow path through which the fluid (air in the example in the embodiment) for the temperature adjustment can flow between the adjacent energy storage device 10 and the second main body portion 221.

The second restricting portions 222 extend in the X-axis direction from the second main body portion 221 and come in contact with the energy storage device 10 (specifically, the case 13), adjacent to the second main body portion 221, from outside in the direction of the Y-Z plane to thereby restrict the movement of the energy storage device 10 in the direction of the Y-Z plane with respect to the second main body portion 221.

The retaining member 4 surrounds peripheries of the plurality of energy storage devices 10 and the plurality of adjacent members 2 to thereby retain the plurality of energy storage devices 10 and the plurality of adjacent members 2 in a block. The retaining member 4 is formed by a member made of metal or the like having conductivity. Specifically, the retaining member 4 includes the paired end members (end portions) 41 disposed on opposite sides of the energy storage devices 10 in the X-axis direction and coupling members (coupling portions) 42 for coupling the paired end members 41.

Each of the paired end members 41 is disposed so that the second adjacent member 22 is sandwiched between the energy storage device 10 disposed at the end in the X-axis direction and the end member 41. The end members 41 are spreading in the direction of the Y-Z plane. Specifically, each of the end members 41 includes a main body 411 having an outline (rectangular outline in the embodiment) corresponding to the energy storage device 10 and a pressing portion 412 protruding from the main body 411 toward the second main body portion 221 of the second adjacent member 22 to come in contact with and press the second adjacent member 22.

Figure 5:
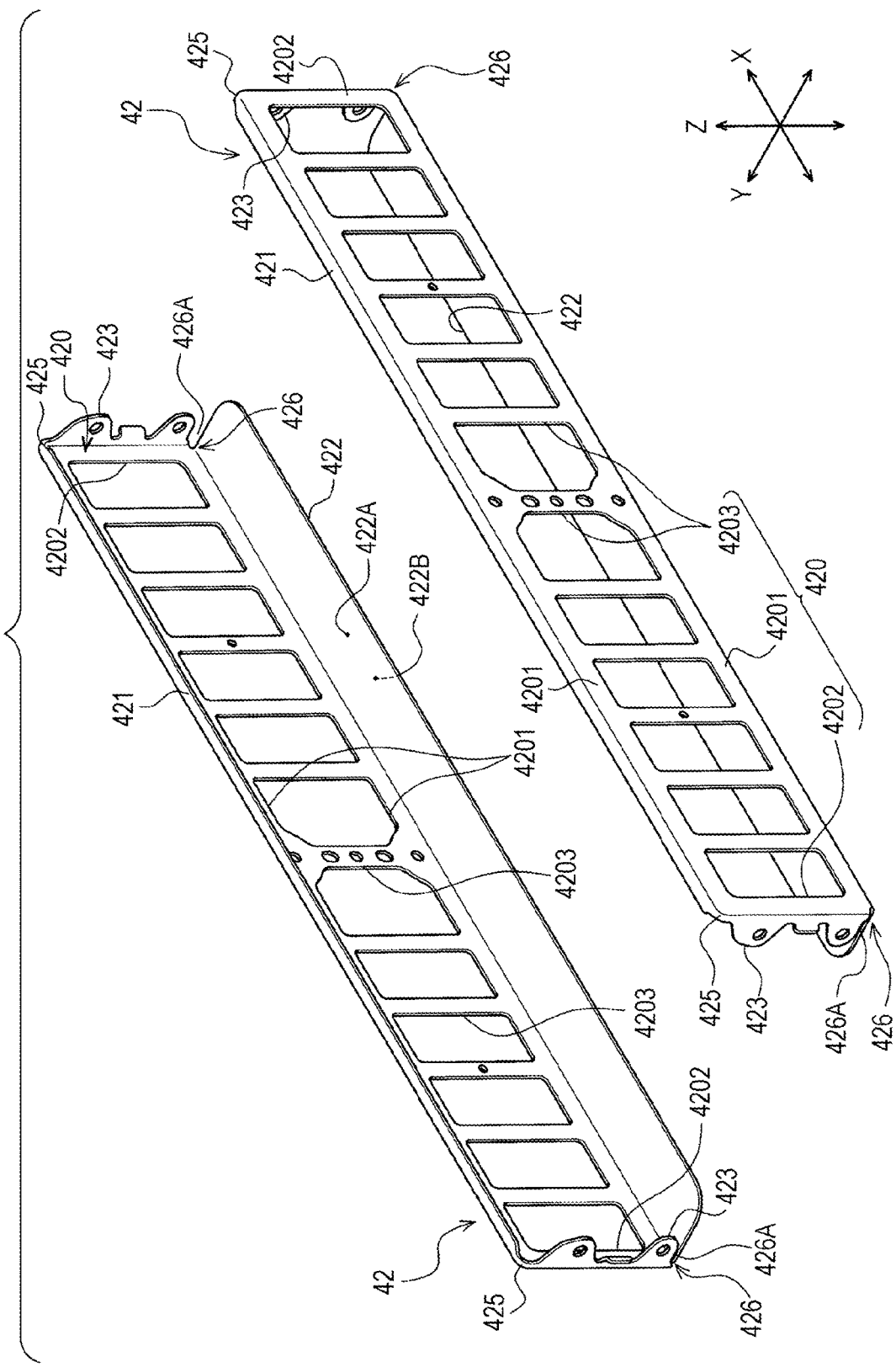
FIG. 5 is a perspective view of paired coupling members included in the energy storage apparatus.
Figure 6:
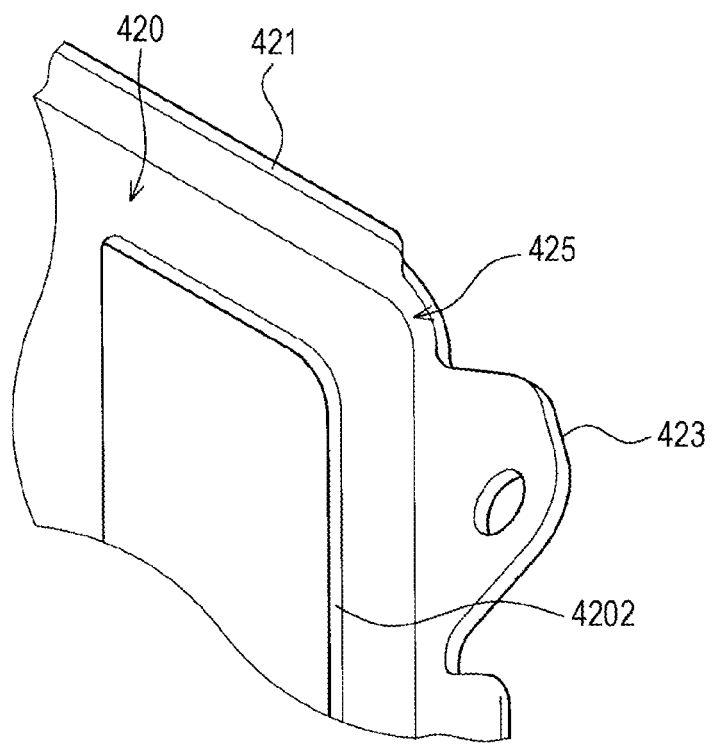
FIG. 6 is an enlarged perspective view of an area including a first end corner portion of the coupling member.
Figure 6:
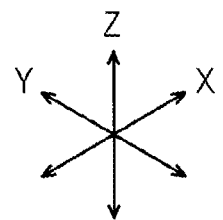

The paired coupling members 42 are disposed on opposite sides of the plurality of energy storage devices 10 in the Y-axis direction. As also shown in FIGS. 5 and 6, each of the paired coupling members 42 includes a main body portion 420 facing the energy storage devices 10 in the Y-axis direction, a first extending portion 421 extending along the first end faces 13A of the energy storage devices 10 from the main body portion 420, end extending portions 423 extending along the end members 41 from the main body portion 420, and drain portions 426A provided to portions of the coupling member 42 near the second end faces 13B of the energy storage devices 10. Each of the paired coupling members 42 includes a second extending portion 422 extending along the second end faces 13B of the energy storage device 10 from the main body portion 420. The main body portion 420, the first extending portion 421, and the end extending portions 423 are continuously connected to each other to thereby form first end corner portions 425 of the coupling member 42. In other words, each of the first end corner portions 425 is a portion where the main body portion 420, the first extending portion 421, and the end extending portion 423 are continuously connected. The main body portion 420, the second extending portion 422, and the end extending portions 423 form second end corner portions 426 of the coupling member 42. In other words, each of the second end corner portions 426 is a portion where the main body portion 420, the second extending portion 422, and the end extending portion 423 are continuously connected or close to each other. At each of the second end corner portions 426 in the embodiment, the main body portion 420 and the second extending portion 422 are continuously connected to each other, the main body portion 420 and the end extending portion 423 are continuously connected to each other, and the second extending portion 422 and the end extending portion 423 are close to each other (specifically, a slit-shaped clearance is left between an end portion in the X-axis direction of the second extending portion and an end portion in the Z-axis direction of the end extending portion 423). The first end corner portions 425 and the second end corner portions 426 are the portions for retaining corner portions of the cases 13 of the energy storage devices 10 disposed on outermost sides in the X-axis direction. Each of the second end corner portions 426 in the embodiment has the above-described drain portion 426A.

The main body portion 420 is a plate-shaped portion facing, in the Y-axis direction, the plurality of energy storage devices 10 (specifically, the respective fourth end faces 13D) arranged in the X-axis direction. The main body portion 420 in the embodiment is in a plate shape along an X-Z plane (plane including the X axis and the Z axis) and a rectangular shape long in the X-axis direction. The main body portion 420 includes paired beam portions 4201 extending in the X-axis direction and disposed at an interval in the Z-axis direction, paired first connecting portions 4202 extending in the Z-axis direction and connecting end portions of the paired beam portions 4201, and second connecting portions 4203 extending in the Z-axis direction and connecting the paired beam portions 4201 at midway positions in the X-axis direction (positions overlapping, when seen in the Y-direction, the energy storage devices 10 disposed at the midway positions out of the plurality of energy storage devices 10 arranged in the X-axis direction in the embodiment).

One of the paired beam portions 4201 extends in the X-axis direction along end portions of the fourth end faces 13D near the first end faces 13A of the respective energy storage devices 10. The other of the paired beam portions 4201 extends in the X-axis direction along end portions of the fourth end faces 13D near the second end faces 13B of the respective energy storage devices 10. The plurality of second connecting portions 4203 in the embodiment are arranged at intervals in the X-axis direction.

The first extending portion 421 is the plate-shaped portion extending along the first end faces 13A of the respective energy storage devices 10 from the main body portion 420 (specifically, the beam portion 4201) and extending from one of the end members 41 to the other end member 41. The first extending portion 421 in the embodiment extends in the Y-axis direction from an end portion (an upper end in FIG. 5) of the main body portion 420 near the first end faces 13A and extends continuously from one of the end members 41 to the other end member 41 in the X-axis direction.

The second extending portion 422 is the plate-shaped portion extending along the second end faces 13B of the respective energy storage devices 10 from the main body portion 420 (specifically, the beam portion 4201) and extending from one of the end members 41 to the other end member 41. The second extending portion 422 in the embodiment extends in the Y-axis direction from an end portion (a lower end in FIG. 5) of the main body portion 420 near the second end faces 13B and extends continuously from one of the end members 41 to the other end member 41 in the X-axis direction. The second extending portion 422 has a larger dimension than the first extending portion 421 in the Y-axis direction.

The end extending portions 423 are the plate-shaped portions extending along the end members 41 from the main body portion 420 (specifically, the first connecting portions 4202). The end extending portions 423 are the portions of the coupling member 42 that are fixed to the end members 41 to thereby connect the end members 41 and the coupling members 42. The end extending portions 423 in the embodiment are fastened to the end members 41 by use of screws B. The end extending portions 423 extend in the Y-axis direction from end portions (left and right ends in FIG. 5) in the X-axis direction of the main body portion 420. Each of the end extending portions 423 in the embodiment extends from one end portion (near the first end face 13A) to a position near the other end portion (near the second end face 13B) of the main body portion 420 in the Z-axis direction.

Each of the first end corner portions 425 is formed by continuously connecting (connecting) a corner portion of the main body portion 420 near the first end face 13A, an end portion of the first extending portion 421 in the X-axis direction, and an end portion of the end extending portion 423 in the Z-axis direction to each other without leaving clearances therebetween. The first end corner portions 425 in the embodiment are formed by drawing, pressing, or the like. The first end corner portions 425 in the embodiment form corner portions of the energy storage apparatus 1 near the first end faces 13A as well.

Each of the second end corner portions 426 is formed by a corner portion of the main body portion 420 near the second end face 13B, an end portion of the second extending portion 422 in the X-axis direction, and an end portion of the end extending portion 423 in the Z-axis direction. The second end corner portions 426 in the embodiment form corner portions of the energy storage apparatus 1 near the second end faces 13B as well. Each of the second end corner portions 426 has the drain portion 426A between the second extending portion 422 and the end extending portion 423.

Each of the drain portions 426A is a clearance formed between the second extending portion 422 and the end extending portion 423. Each of the drain portions 426A in the embodiment is a small clearance (of about 3 to 6 mm), through which water can barely pass, so as to secure strength of the retaining member 4. Through the clearances (drain portions 426A), it is possible to drain water inside the second end corner portions 426 (on the side of the energy storage devices 10) to the outside. Each of the drain portions 426A in the embodiment is the clearance extending in the Y-axis direction, closed at one end with the main body portion 420, and open at the other end in the Y-axis direction. The drain portions 426A are formed by bending a plate member having a predetermined shape in order to form the second end corner portions 426.

Figure 7:
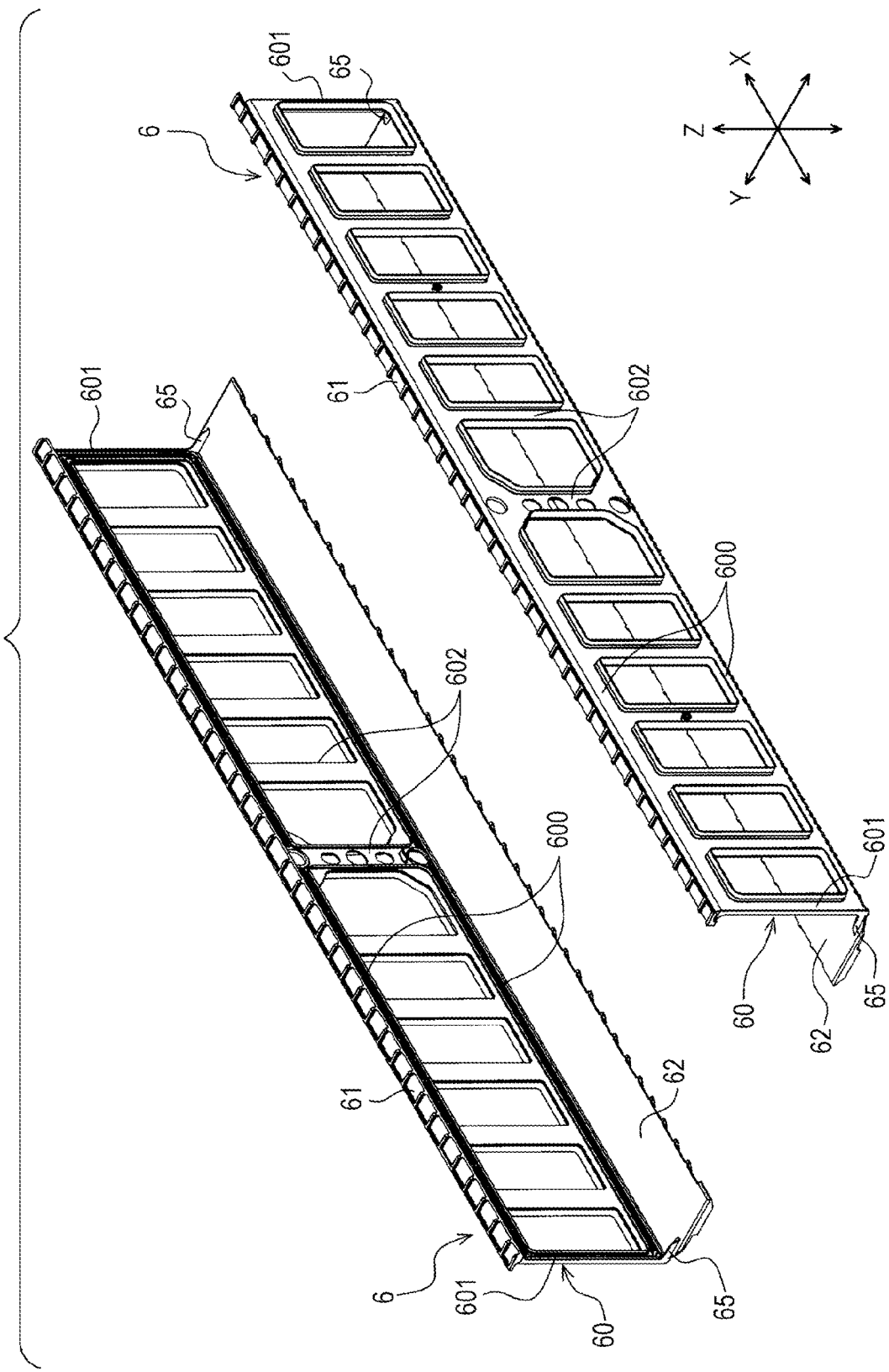
FIG. 7 is a perspective view of paired insulators included in the energy storage apparatus.

Each of the insulators 6 has an insulation property and disposed between each of the coupling members 42 and the plurality of energy storage devices 10 arranged in the X-axis direction. The insulator 6 covers at least a face (area) of the coupling member 42 facing the energy storage devices 10. In this way, the insulators 6 insulate the retaining member 4 and the plurality of energy storage devices 10 arranged in the X-axis direction from each other. To put it concretely, as also shown in FIG. 7, each of the insulators 6 includes a main body cover portion 60 for covering the main body portion 420, a first cover portion 61 for covering the first extending portion 421, and a second cover portion 62 for covering the second extending portion 422.

The main body cover portion 60 covers the face (hereinafter also referred to as "main body facing face") of the main body portion 420 facing the energy storage devices 10 (specifically, the fourth end faces 13D). The main body cover portion 60 has a shape corresponding to the main body portion 420. In other words, the main body cover portion 60 includes paired beam portion cover portions 600 for covering faces of the beam portions 4201 facing the energy storage devices 10, paired first connection cover portions 601 for covering faces of the first connecting portions 4202 facing the energy storage devices 10, and a plurality of second connection cover portions 602 for covering faces of the second connecting portions 4203 facing the end members 41.

The first cover portion 61 covers at least a face (area) of the first extending portion 421 facing the energy storage devices 10. The first cover portion 61 in the embodiment covers both of the face of the first extending portion 421 facing the energy storage devices 10 (first end faces 13A) and a face of the first extending portion 421 on an opposite side from the energy storage devices 10.

Figure 8:
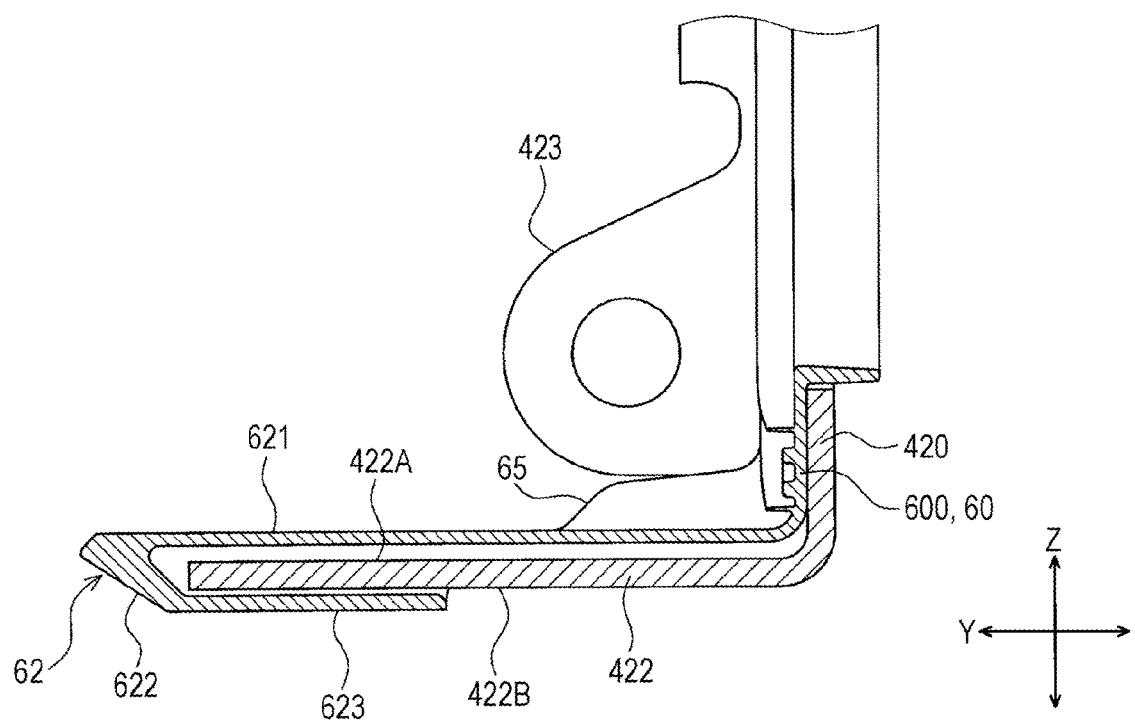
FIG. 8 is a sectional view of the insulator and the coupling member.

As also shown in FIG. 8, the second cover portion 62 extends from a boundary position between the second extending portion 422 and the main body portion 420 to a tip end (tip end in the Y-axis direction) of the second extending portion 422 along a face 422A of the second extending portion 422 facing the energy storage devices 10 (second end faces 13B), is folded back at the tip end, and extends along a face (outer face) 422B of the second extending portion 422 on an opposite side from the energy storage devices 10. In other words, the second cover portion 62 includes a first portion 621 for covering the face of the second extending portion 422 facing the second end faces 13B, a second portion 622 for covering the tip end of the second extending portion 422, and a third portion 623 for covering the outer face of the second extending portion 422.

The first portion 621 is the plate-shaped portion of the second cover portion 62 spreading along the facing face 422A of the second extending portion 422. To put it concretely, the first portion 621 is in a shape of a rectangle of size corresponding to the second extending portion 422. The second portion 622 is the portion of the second cover portion 62 folded back from a tip end (end edge in the Y-axis direction) of the first portion 621 to cover the tip end of the second extending portion 422. The third portion 623 is the plate-shaped portion of the second cover portion 62 spreading along the outer face 422B of the second extending portion 422. To put it concretely, the third portion 623 is the rectangular plate-shaped portion. The third portion 623 has a smaller dimension than the second extending portion 422 in the Y-axis direction.

In the above-described second cover portion 62, at each of the opposite ends in the X-axis direction, a clearance between the first portion 621 and the third portion 623 is closed. As a result, the tip end portion (tip end portion in the Y-axis direction) of the second cover portion 62 is formed in a bag shape into which the tip end portion of the second extending portion 422 is inserted.

Figure 9:
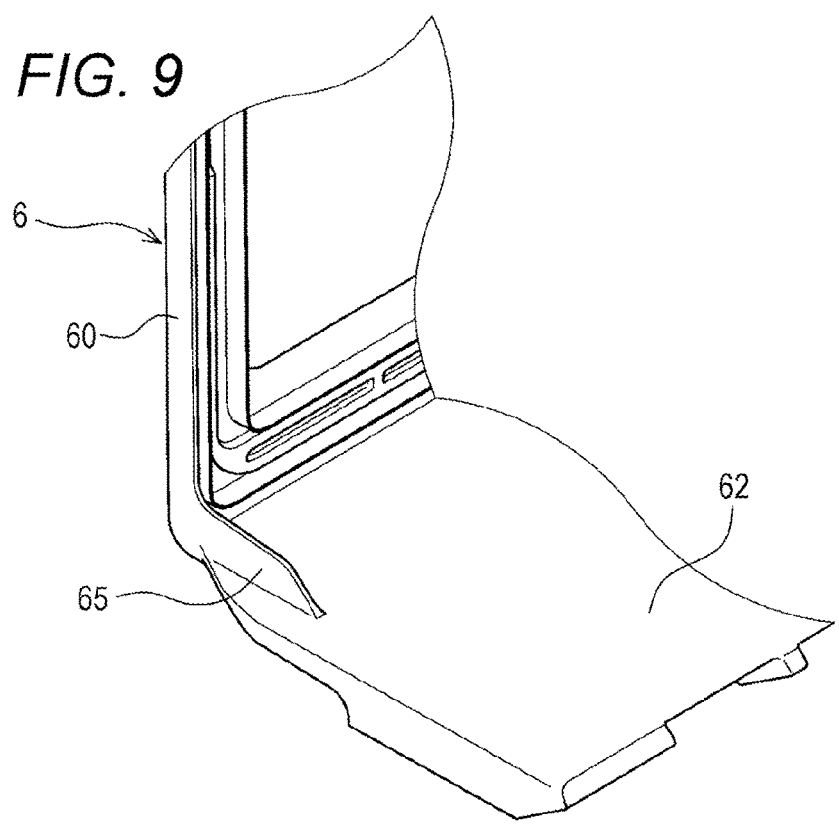
FIG. 9 is an enlarged perspective view of a portion including a boundary between a main body cover portion and a second cover portion of the insulator.
Figure 10:
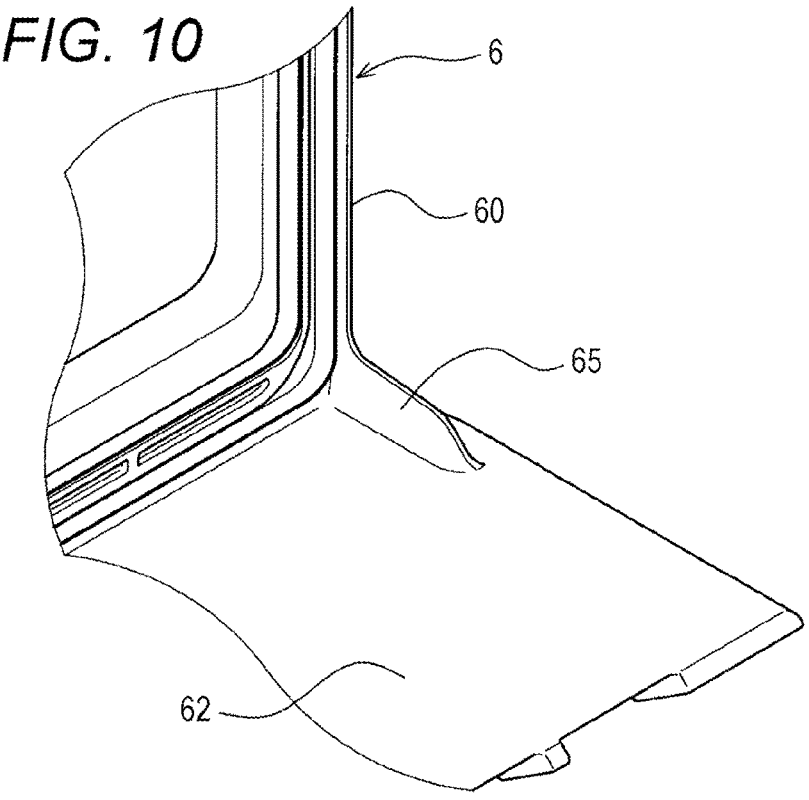
FIG. 10 is an enlarged perspective view of a portion including the boundary between the main body cover portion and the second cover portion of the insulator.
Figure 11:
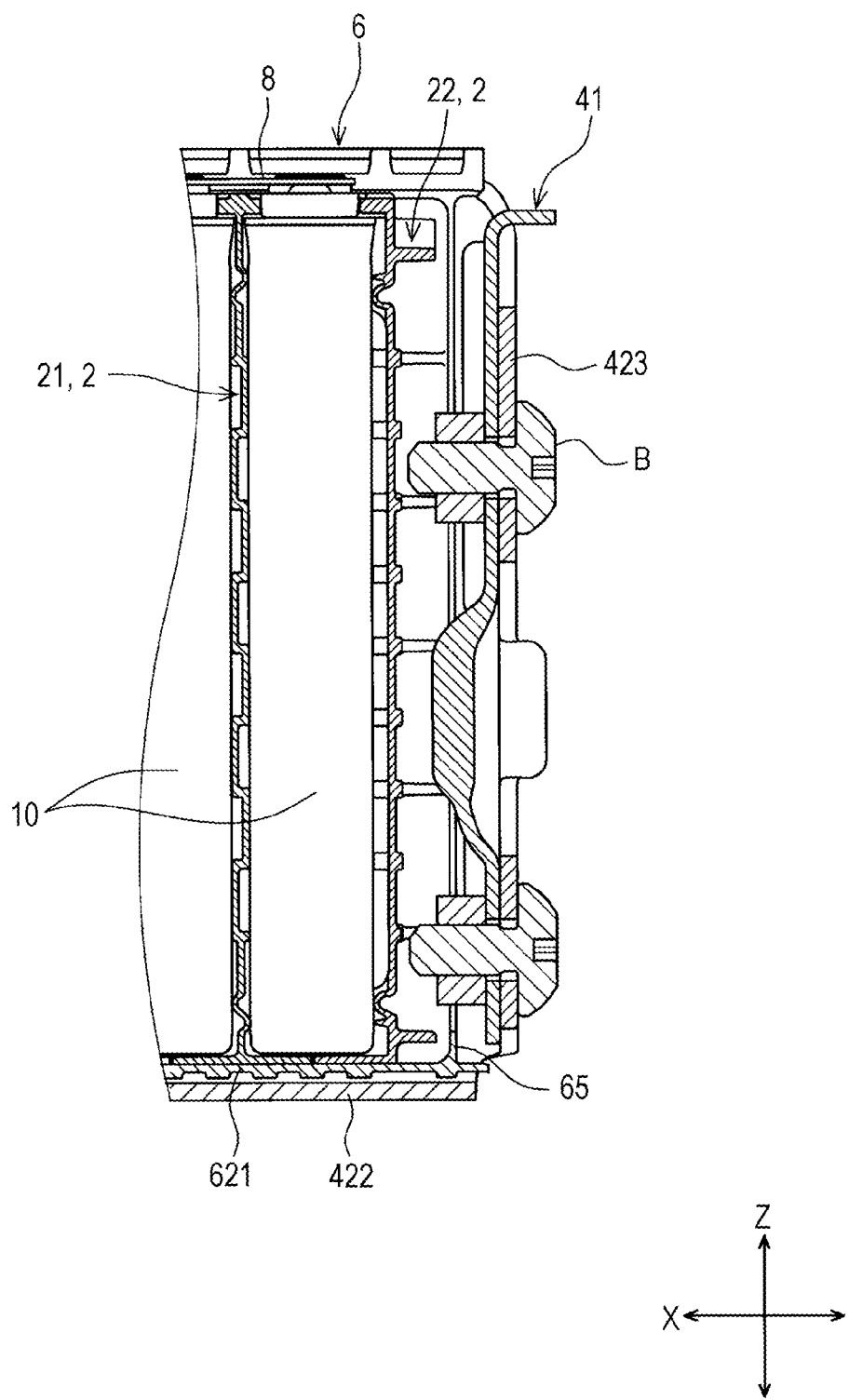
FIG. 11 is a sectional view of a portion of the energy storage apparatus around an end member.

As also shown in FIGS. 9 to 11, each of the insulators 6 has a convex part 65 positioned astride the main body portion 420 and the second extending portion 422 between each of the end members 41 and the energy storage device 10 adjacent to the end member 41. In the energy storage apparatus 1 in the embodiment, each of the convex parts 65 is disposed on an inner side of the drain portion 426A in the X-axis direction. In other words, each of the drain portions 426A is disposed on an outer side of the convex part 65 in the X-axis direction.

To put it concretely, each of the convex parts 65 protrudes from the first portion 621 of the second cover portion 62 and extends from a midway position of the first portion 621 in the Y-axis direction to the main body cover portion 60. Each of the convex parts 65 in the embodiment has a thin plate shape (plate shape along the Y-Z plane) extending in the Y-axis direction from the main body portion 420. An amount of protrusion (height from the first portion 621) of each of the convex parts 65 is set to such an amount as to be able to prevent movement of water, which remains undrained from the second end corner portion 426 through the drain portion 426A, toward the energy storage devices 10.

Each of the bus bars 8 is the plate-shaped member made of metal or the like having conductivity. Each of the bus bars 8 makes the external terminals 14 of the different energy storage devices 10 electrically continuous with each other. The plurality of bus bars 8 (the corresponding number of bus bars 8 to the plurality of energy storage devices 10) are provided to the energy storage apparatus 1. The plurality of bus bars 8 in the embodiment connect all of the plurality of energy storage devices 10 included in the energy storage apparatus 1 in series (i.e., make the energy storage devices 10 electrically continuous with each other).

According to the above-described energy storage apparatus 1, when the energy storage apparatus 1 is disposed so that the second end corner portions 426 are at lower positions than the other portions, water of condensation or the like occurring on each of the faces of the retaining member 4 facing the energy storage devices 10 may gather into the corner portions (second end corner portions) 426 of the retaining member 4. Even in this case, the water is drained outside through the drain portions 426A and therefore the water is less likely to be accumulated in the corner portions (second end corner portions) 426.

In the energy storage apparatus 1 in the embodiment, each of the insulators 6 has the convex parts 65 each of which is positioned astride the main body portion 420 and the second extending portion 422 between each of the end members 41 and the energy storage device 10 adjacent to the end member 41. Therefore, even if the water remains undrained from each of the second end corner portions 426 through the drain portion 426A, the water is prevented by the convex part 65 from flowing toward the energy storage devices 10. As a result, it is possible to effectively prevent the electrical continuity between the retaining member 4 and the energy storage devices 10 through the water.

In the energy storage apparatus 1 in the embodiment, the first extending portion 421 and the second extending portion 422 respectively and continuously extend from one of the end members 41 to the other end member 41 in the X-axis direction. In the energy storage apparatus 1, the second extending portion 422 has the larger dimension than the first extending portion 421 in the Y-axis direction. In this way, in the retaining member 4, even if strength of each of the second end corner portions 426 is reduced by the provision of the drain portion 426A to the second end corner portion 426, it is possible to make the dimension of the second extending portion 422 larger than the dimension of the first extending portion 421 in the Y-axis direction to thereby prevent strength of the portion of the retaining member 4 on the side of the second extending portion 422 from becoming lower than strength of the portion of the retaining member 4 on the side of the first extending portion 421 including the first end corner portion 425 the strength of which is secured by continuously connecting the portions in the three directions (the first extending portion 421, the main body portion 420, and the end extending portion 423).

Figure 12:
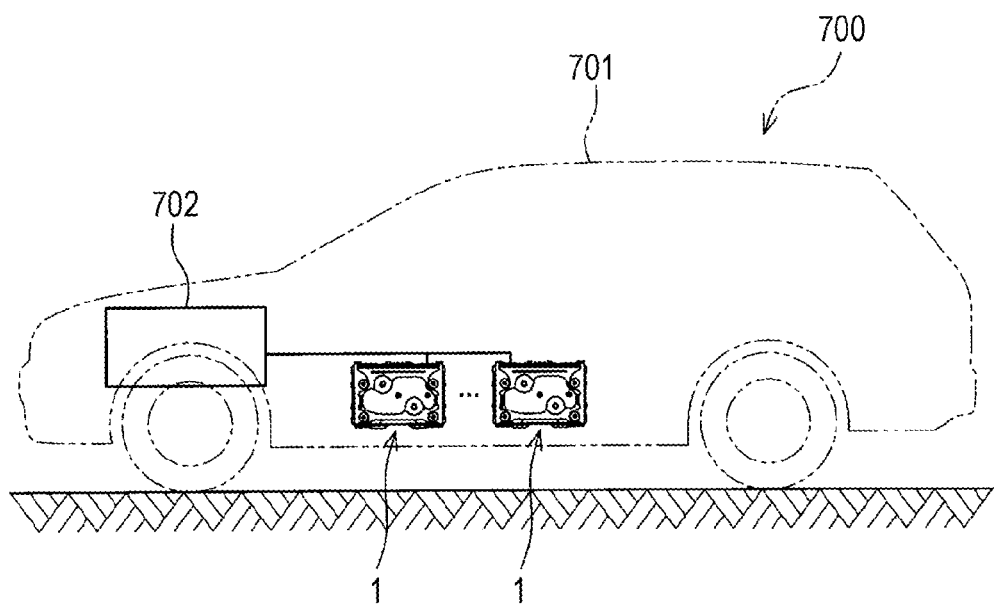
FIG. 12 is a schematic view for explaining a moving body according to a second embodiment.

Next, a second embodiment of the present invention will be described with referent to FIG. 12. Configurations similar to those in the above-described first embodiment will be provided with the identical reference signs and will not be repeatedly described in detail and only different configurations will be described in detail. The second embodiment of the present invention is a moving body.

The moving body 700 includes energy storage apparatuses 1, a moving body main body 701 mounted with the energy storage apparatuses 1, and a drive portion 702 for driving the moving body main body 701 by use of electric power supplied from the energy storage apparatuses 1. The moving body 700 in the embodiment is an automobile, the moving body main body 701 is a vehicle body, and the drive portion 702 is a motor. The moving body 700 is not limited to the automobile and may be an aircraft, a ship, a railroad vehicle, a construction machine, or the like. In other words, the moving body 700 may be anything that moves (travels) by using electric power supplied from the energy storage apparatus 1.

In the moving body 700, the energy storage apparatuses 1 are disposed with drain portions 426A positioned at lower end portions of the energy storage apparatuses 1. In an example shown in FIG. 12, the energy storage apparatuses 1 are disposed in such attitudes that the external terminals 14 of each of the energy storage devices 10 protrude upward from the first end face 13A, i.e., the respective drain portions 426A provided at the four corners near the second extending portions 422 of each of the energy storage apparatuses 1 are positioned at the lower end portion of the energy storage apparatus 1. However, it is at least one of the drain portions 426A provided to the respective four corners near the second extending portions 422 of each of the energy storage apparatuses 1 that needs to be positioned at the lower end portion of the energy storage apparatus 1.

In the moving body 700 in the embodiment, the plurality of energy storage apparatuses 1 are mounted in the same attitudes into the moving body main body 701.

According to the above-described moving body 700, even if water of condensation or the like occurring on each of faces of a retaining member 4 facing the energy storage devices 10 gathers into corner portions (second end corner portions) 426 of the retaining member 4 in each of the energy storage apparatuses 1 mounted into the moving body 700, the water is drained outside through the drain portions 426A and therefore the water is less likely to be accumulated in the corner portions (second end corner portions) 426.

Figure 13:
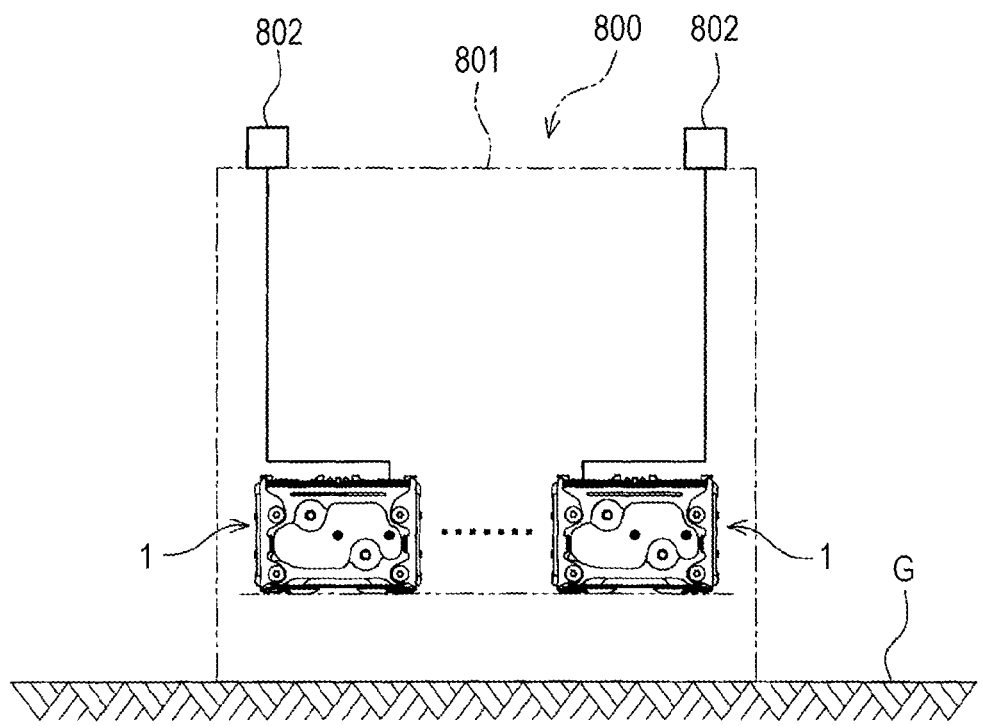
FIG. 13 is a schematic view for explaining an energy storage system according to a third embodiment.
Figure 14:
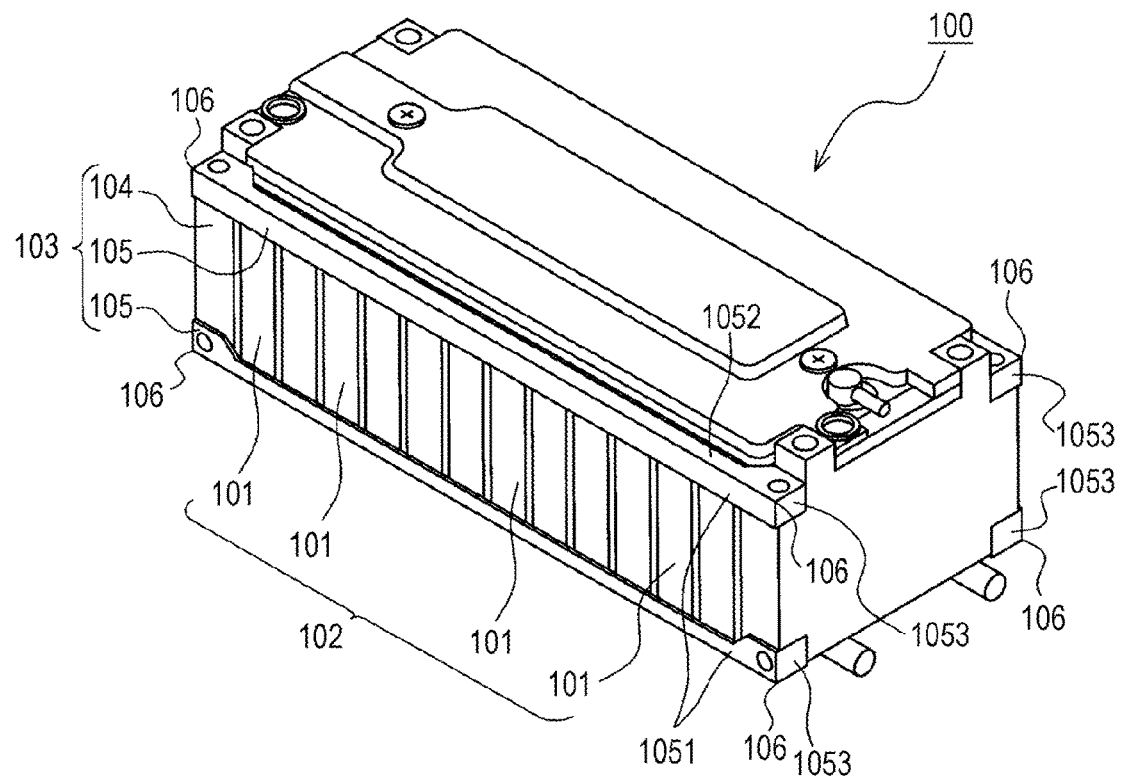
FIG. 14 is a perspective view of a conventional battery block.
Figure 15:
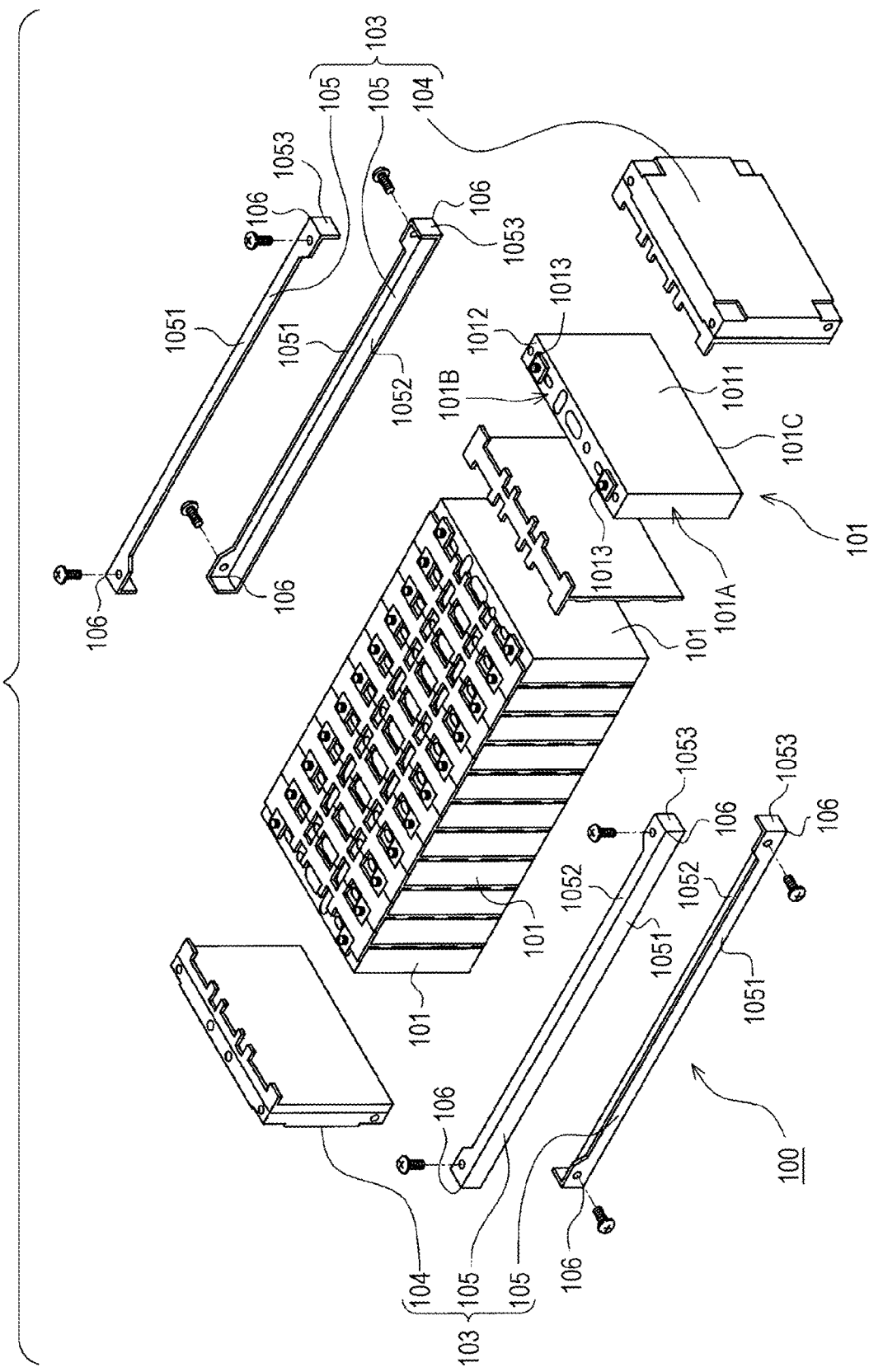
FIG. 15 is an exploded perspective view of the battery block.

Next, a third embodiment of the present invention will be described with referent to FIG. 13. Configurations similar to those in the above-described first embodiment will be provided with the identical reference signs and will not be repeatedly described in detail and only different configurations will be described in detail. The third embodiment of the present invention is an energy storage system.

The energy storage system 800 includes energy storage apparatuses 1, an energy storage system main body 801 mounted with the energy storage apparatuses 1, and input/output terminals 802 which are connected to the energy storage apparatuses 1 (specifically, all terminals of the energy storage apparatuses 1) and through which electric power can be input from outside and output to the outside. The energy storage system 800 in the embodiment is used for wind power generation, solar power generation, or the like, the energy storage system main body 801 is a housing installed at an installation site G, and the input/output terminals 802 are the terminals connected to a wind turbine, a solar cell, a power transmission system for electric power transmission to the outside, or the like. The energy storage system 800 is not limited to the system for storing electric power generated by the wind turbine or the solar cell and may be a home system for storing inexpensive night-time electric power, a backup system for constantly storing a certain amount of electric power in case of disasters, or the like.

In the energy storage system 800, the energy storage apparatuses 1 are disposed with drain portions 426A positioned at lower end portions of the energy storage apparatuses 1. In an example shown in FIG. 13, the energy storage apparatuses 1 are disposed in such attitudes that external terminals 14 of each of energy storage devices 10 protrude upward from a first end face 13A, i.e., the respective drain portions 426A provided at four corners near second extending portions 422 of each of the energy storage apparatuses 1 are positioned at the lower end portion of the energy storage apparatus 1. However, it is at least one of the drain portions 426A provided to the respective four corners near the second extending portions 422 of each of the energy storage apparatuses 1 that needs to be positioned at the lower end portion of the energy storage apparatus 1.

In the energy storage system 800 in the embodiment, the plurality of energy storage apparatuses 1 are mounted in the same attitudes into the energy storage system main body 801.

According to the above-described energy storage system 800, even if water of condensation or the like occurring on each of faces of a retaining member 4 facing the energy storage devices 10 gathers into corner portions (second end corner portions) 426 of the retaining member 4 in each of the energy storage apparatuses 1 disposed in the energy storage system 800, the water is drained outside through the drain portions 426A and therefore the water is less likely to be accumulated in the corner portions (second end corner portions) 426.

Needless to say, the energy storage apparatus, the moving body, and the energy storage system according to the present invention are not limited to the above-described embodiments and various changes can be made without departing from the gist of the present invention. For example, to a configuration of one of the embodiments, a configuration of another of the embodiments may be added. A part of a configuration of one of the embodiments may be replaced with a configuration of another of the embodiments. Furthermore, a part of a configuration of one of the embodiments may be eliminated.

Although the corner portions (second end corner portions) 426 provided with the drain portions 426A are disposed at the coupling members 42 in the energy storage apparatus 1 in each of the above-described embodiments, the present invention is not limited to this configuration. For example, corner portions (second end corner portions) 426 provided with drain portions 426A may be disposed at a retaining member 4, i.e., the corner portions 426 provided with the drain portions 426A may be formed astride coupling members 42 and end members (end portions) 41 or formed at the end members (end portions) 41. For example, to put it concretely, in the retaining member 4, each of first end corner portions 425 may be formed by continuously connecting each of main body portions 420, each of first extending portions 421, and each of end members (end portions) 41 and each of second end corner portions 426 may be formed by each of the main body portions 420, each of the second extending portions 422, and each of the end members (end portions) 41.

According to this configuration, similarly to the energy storage apparatus 1 in each of the above-described embodiments, when the energy storage apparatus 1 is disposed so that the second end corner portions 426 are at lower positions than the other portions, water of condensation or the like occurring on each of faces of the retaining member 4 facing energy storage devices 10 may gather into the corner portions (second end corner portions) 426 of the retaining member 4. Even in this case, the water is drained outside through the drain portions 426A. Therefore, the water is less likely to be accumulated in the corner portions (second end corner portions) 426.

Although the paired beam portions 4201 of each of the coupling members 42 are connected by the first and second connecting portions 4202, 4203 in the energy storage apparatus 1 in each of the above-described embodiments, the present invention is not limited to this configuration. For example, each of main body portions 420 may have paired beam portions 4201 only, i.e., the paired beam portions 4201 may be independent of each other. In this case, first end corner portions 425 are provided to the beam portion 4201 disposed near first end faces 13A and second end corner portions 426 having drain portions 426A are provided to the beam portion 4201 disposed near the second end faces 13B (for example, the drain portions 426A are provided to the configuration shown in FIG. 13).

Although the drain portions 426A provided to the second end corner portions 426 are the clearances formed by bending the plate-shaped portions in the energy storage apparatus 1 in each of the above-described embodiments, the present invention is not limited to this configuration. For example, the drain portions 426A may be notches, holes, slits, or the like. In other words, the drain portions 426A only have to have such configurations (shapes) as to be able to drain the water inside the second end corner portions 426 (on the side of the energy storage devices 10) to the outside.

Although each of the coupling members 42 includes the main body portion 420, the first extending portion 421, the second extending portion 422, and the end extending portions 423 in the energy storage apparatus 1 in each of the above-described embodiments, the present invention is not limited to this configuration. Each of the coupling members 42 only has to include at least the main body portion 420, the first extending portion 421, and portions of the end extending portions 423 forming the first end corner portions 425 (only upper end portions of the end extending portions 423 in FIG. 1). In other words, each of the coupling members 42 does not have to include the second extending portion 422 and end portions of the end extending portions 423 near the second extending portion 422.

Although the main body portion 420 of each of the coupling members 42 is disposed in a range in the Z-axis direction from an end portion of the fourth end face 13D near the first end face 13A of each of the energy storage devices 10 to an end portion of the fourth end face 13D near the second end face 13B in the energy storage apparatus 1 in each of the above-described embodiments, the present invention is not limited to this configuration. The main body portion 420 only has to be disposed in such a range in the Z-axis direction as to be able to form the first end corner portions 425. In other words, the main body portion 420 only has to include at least a portion extending in the X-axis direction along end portions of the fourth end faces 13D near the first end faces 13A of the respective energy storage devices 10.

Although the drain portions 426A are provided to the end portions in the X-axis direction of the portion of each of the coupling members 42 on the side of the second extending portion 422 in the energy storage apparatus 1 in each of the above-described embodiments, the present invention is not limited to this configuration. The drain portions 426A may be disposed at midway positions in the X-axis direction of the portion of each of the coupling members 42 on the side of the second extending portion 422. In this case, at each of the second end corner portions 426, the main body portion 420, the second extending portion 422, and the end extending portion 423 may be continuously connected to each other without leaving clearances. The drain portion 426A may be disposed throughout an entire area in the X-axis direction or the Y-axis direction of the end portion of each of the coupling members 42 on the side of the second extending portion 422.

Although each of the energy storage devices is used as the chargeable and dischargeable nonaqueous electrolyte secondary battery (e.g., lithium ion secondary battery) in the case described in each of the above-described embodiments, the energy storage device is of any type and size (capacity). Although the lithium ion secondary battery has been described as an example of the energy storage device in each of the above-described embodiments, the energy storage device is not limited to the lithium ion secondary battery. For example, the present invention can be applied to various secondary batteries, primary batteries, and an energy storage device of a capacitor such as an electric double layer capacitor.

What is claimed is:
1. An energy storage apparatus comprising:
an energy storage device including a surface having a first end face from which an external terminal protrudes and a second end face on an opposite side from the first end face; and
a retaining member that includes paired end portions disposed on opposite sides of the energy storage device in a second direction orthogonal to a first direction in which the external terminal protrudes and a coupling portion for coupling the paired end portions and that retains the energy storage device,
wherein the coupling portion includes
a main body portion facing the energy storage device in a third direction orthogonal to the first direction and the second direction, a first extending portion extending along the first end face from the main body portion, and an end extending portion extending along the end portion from the main body portion, a drain portion is provided to a position of the energy storage apparatus near the second end face, and the main body portion, the first extending portion, and the end extending portion are continuously connected to each other to thereby form first end corner portions of the coupling portion;

the energy storage apparatus further comprising an insulating member for covering at least a face of the coupling portion facing the energy storage device, wherein the coupling portion has a second extending portion extending along the second end face from the main body portion, the insulating member has a convex part positioned astride the main body portion and the second extending portion between each of the end portions and the energy storage device adjacent to the end portion, and the drain portion is disposed on an outer side of the convex portion in the second direction.

2. The energy storage apparatus according to claim 1, wherein the first extending portion and the second extending portion respectively and continuously extend from one of the end portions to the other end portion in the second direction, and a dimension of the second extending portion is larger than a dimension of the first extending portion in the third direction.

3. A moving body comprising:

the energy storage apparatus according to claim 1;

a moving body main body mounted with the energy storage apparatus; and a drive portion for driving the moving body main body by using electric power supplied from the energy storage apparatus, wherein the energy storage apparatus is disposed with the drain portion positioned at a lower end portion of the energy storage apparatus.

4. An energy storage system comprising:

the energy storage apparatus according to claim 1;

an energy storage system main body mounted with the energy storage apparatus; and an input/output terminal which is connected to the energy storage apparatus and through which electric power can be input from outside and output to the outside, wherein the energy storage apparatus is disposed with the drain portion positioned at a lower end portion of the energy storage apparatus.

* * * * *